United States Patent [19]

McCormick

[11] Patent Number: 4,580,934
[45] Date of Patent: Apr. 8, 1986

[54] HOLE SIZING TOOL

[76] Inventor: Wallace W. McCormick, Rte. 3, Box 437, Live Oak, Fla. 32060

[21] Appl. No.: 560,375

[22] Filed: Dec. 12, 1983

[51] Int. Cl.$^4$ .......................................... B23B 51/08
[52] U.S. Cl. ................................... 408/201; 144/150; 144/219; 408/227
[58] Field of Search .............. 408/201, 203, 200, 196, 408/223, 227, 228; 407/53, 54; 144/150, 219, 235

[56] References Cited

U.S. PATENT DOCUMENTS

| | | | |
|---|---|---|---|
| 967,255 | 8/1910 | Snell et al. | 408/201 |
| 1,461,462 | 7/1923 | Smith et al. | 408/201 |
| 2,009,168 | 7/1935 | Dettmer | 408/201 |
| 2,443,257 | 6/1948 | Leo | 408/200 |
| 2,470,392 | 5/1949 | Gassmann | 408/201 |
| 2,811,054 | 10/1957 | Townsend | 408/201 |
| 3,028,772 | 4/1962 | Mossberg | 408/201 X |
| 3,532,010 | 10/1970 | Klintworth | 408/201 |
| 4,414,869 | 11/1983 | Auqustine | 408/709 |

FOREIGN PATENT DOCUMENTS 1031934  6/1953  France .............................. 144/219

*Primary Examiner*—Gil Weidenfeld
*Assistant Examiner*—Glenn L. Webb
*Attorney, Agent, or Firm*—Harold H. Dutton, Jr.

[57] ABSTRACT

A rotary hole sizing tool for enlarging a pre-existing hole comprising a shank portion, a disk-like cutting member having cutting edges formed on the axially advancing face thereof, a pilot member for engaging the walls of the pre-existing hole and aligning the cutting member on the center of the pre-existing hole, the pilot member including a stepped shoulder of reduced diameter forming an undercut clearance between the pilot member and the cutting member, and screw means for securing the pilot member and the cutting member to the mandrel.

11 Claims, 7 Drawing Figures

HOLE SIZING TOOL

This invention relates to a hole sizing tool for use in boring or drilling machines. More particularly, this invention relate to a tool for accurately enlarging the size of a previously drilled hole, particularly in the field of woodworking.

BACKGROUND AND OBJECTS

In the past, many tools have been devised for boring or drilling holes in workpieces, particularly for use in the field of woodworking. Such tools are most often used in hand drills, electric drills, drill presses, lathes, and the like. Such implements range from the conventional drill bits of the so-called "twist" type, to the "spade" type bits often used for larger diameter holes, to fly cutters which are often used for cutting still larger holes into the workpiece.

The twist type drill bits usually include a pair of cutting edges machined on the leading face of the bit and formed in such a manner that the edges meet at a point and connect to spiral grooves formed in the body of the bit.

The spade type bits, as their name implies, has a flat body portion and a pair of cutting edges formed at the leading edge of the body and connected by a point which extends in the advancing direction of the bit.

Fly cutters typically have a radially directed arm to which is attached a small twist type drill bit, used to center the cutter, and a parallel blade extending forwardly of the arm with a cutting edge on the distal edge of the blade. The blade rotates about the drill bit, and the tool cuts an annular plug out of the workpiece, rather than cutting all of the material within the outer diameter of the tool as in the case of other types of bits.

Each of these types of implements, however, suffers from the disadvantage that they cannot be used for increasing the size of a previously drilled or bored hole in a workpiece. These prior art implements lack this specific ability since they each rely upon a centering point about which the cutting edges rotate, but for a pre-existing hole, there is no material which this point can engage, and thus there is no way to center the tool.

In essence, the prior art lacks the ability to increase the diameter of an existing hole while reliably maintaining the original center.

This disadvantage is not quite as significant in the case of a twist drill, since the tapered cutting edges tend to self-center on the pre-existing hole, but this method lacks the precision required by many craftsmen.

In addition, the twist drills, because of their tapered point, cannot drill a hole with a flat bottom, nor can they drill a stepped hole with a squared off shoulder as is often necessary in wooden joint construction.

Although some of these problems can be overcome with a lathe using a cutting tool, this requires a rather significant expense to accomplish a rather simple job.

In the past, some tools have been proposed for overcoming these disadvantages, such as the counterboring tool described in U.S. Pat. No. 2,009,168 issued July 23, 1935 to A. B. Dettmer. However, this device has apparently met with little success as the same problems continue to face the craftsman.

Therefor, a primary object of the present invention is to provide an improved tool for enlarging the diameter of pre-existing holes.

Another object of this invention is to provide a tool which may be used in hand drills, portable electric drills, drill presses, or lathes with equal success.

A further object of this invention is to provide an improved hole sizing tool wherein a particular cutting member may be used with different size pilot members or a particular pilot member may be used with different size cutting members.

Still another object of the present invention is to provide an improved hole sizing tool capable of enlarging existing holes while reliably maintaining the original center of the hole.

Yet another object of the invention is to provide an improved hole sizing tool which can provide hole having a flat bottom.

Yet a further object of this invention is to provide a hole sizing tool which can be used to enlarge the size of holes and be capable of use with fractional horsepower motors of the type normally encountered in portable electric drills.

Still another object of this invention is to provide a hole sizing tool which is capable of making smooth cuts in wood, plastic, or other "soft" materials and keeping the sides of the enlarged hole parallel to the pre-existing hole.

These and other objects and advantages of this invention will become apparent when considered in light of the description and claims when taken together with the accompanying drawings.

BRIEF DESCRIPTION OF THE INVENTION

Figure 1:
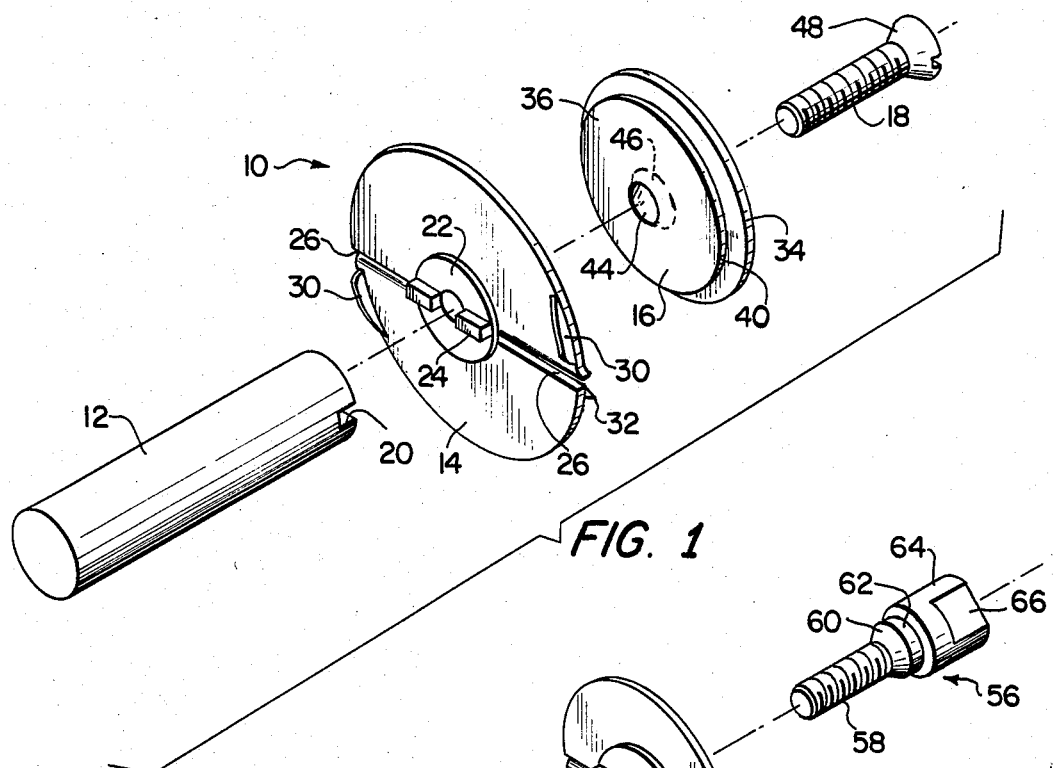
FIG. 1 is an exploded perspective view of one embodiment of the invention.

The tool of the present invention comprises a shank portion or mandrel adapted to be inserted in the chuck or collet of the drive tool, much in the same manner as a drill bit. Attached to the front, or advancing end, of the shank is a cutting member having a central hole through which a screw member passes. The screw member threadedly engages a threaded axial bore in the mandrel for securing the cutting member in position.

The cutting member also is provided with a central, annular portion which is somewhat thicker that the cutting portion of the member and serves to reinforce or strengthen the cutting member. Formed on this central portion is a key means for engaging slots formed in the end face of the mandrel to prevent relative rotation of the cutting member and the mandrel during use.

The screw member also is used for attaching a pilot member to the shank. In one embodiment, the pilot member is an integrally formed extension of the head of the screw. In another embodiment, the pilot member is a disk-like member through which the screw passes. In both cases, the pilot member is coaxial with the cutting member and the shank or mandrel.

The screw includes a tapered portion which engages a correspondingly tapered hole in the cutting member in order to maintain the concentricity of the components.

In one embodiment, the pilot member is cylindrical and of a greater diameter than the head of the screw so as to form a recess between the pilot member and the cutting member which serves as a relief for splinters, chips, shavings and the like as the boring progresses. In the other embodiment, the pilot member has a disk-like configuration and includes a pilot portion on the leading face of the tool and a portion of reduced diameter engaging the face of the cutting member, to form a similar recess between the pilot member and the cutting member for relief of the wood particles as they are cut.

In a preferred embodiment, the cutting member is of a disk-like configuration having a central hub portion and a pair of substantially diametrically opposed slots extending from the hub portion to the periphery of the disk. One edge of each of the slots forms the cutting edge of the tool.

The cutting member also is provided with a pair of wing like projections on the rear face thereof near the periphery of the disk, for stiffening the disk, particularly for use with larger cutting diameters. These projections extend along the periphery of the cutting blade from one edge of each of the slots and project out of the plane of the cutting member rearwardly, away from the normal direction of advance of the tool.

On the front or advancing face of the cutting member, a pair of projections, or cutting teeth, may be provided in the nature of fly cutters. In some cases, when a hole with a groove around its perimeter is not objectionable, or when it may be desired as for a glue joint, the provision of fly cutters enhances the cutting ability of the tool and makes a very clean entry into the workpiece.

The cutting edge on each of the slots may be machined in the material from which the cutting member is formed, or may be in the nature of a carbide insert on the blade.

DESCRIPTION OF PREFERRED EMBODIMENTS

The invention will now be described with reference to the embodiments shown in the drawings. Referring firstly to FIGS. 1, 3 and 5-7, the tool of this invention is generally designated 10 and is seen to include a shank or mandrel 12, a cutting member 14, a pilot member 16 and a screw 18.

The mandrel 12 is provided with an axial threaded hole 13 for the screw 18 and a pair of keyways or slots 20 diametrically opposed and extending from the central hole to the outer edge of the mandrel 12. The mandrel is adapted to be inserted into the chuck or collet of a suitable device for rotating the tool, for example a manual drill, a portable electric drill, drill press or the like, and may be of any suitable length, depending upon the depth of hole to be made.

The cutting member is seen to be generally disk-like and includes a central hub portion 22 of greater thickness than the outer portion of the cutting member 14. The hub 22 also includes a pair of projecting keys 24 adapted to engage the keyways 20 when the cutter is assembled to the mandrel 12. The hub portion 22, due to its greater thickness, serves to strengthen the cutting member 14.

Figure 7:
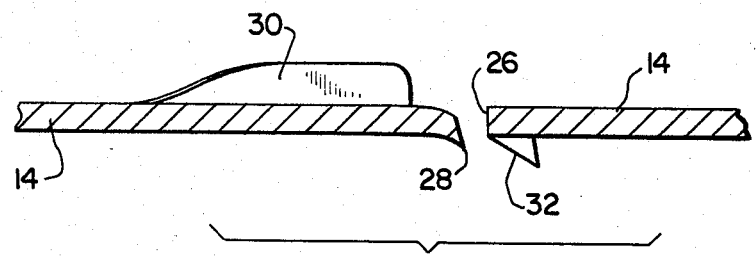
FIG. 7 is an enlarged fragmentary sectional view taken along lines 7—7 of FIG. 5 and viewed in the direction of the arrows.

The cutting member 14 is also provided with a pair of diametrically opposed slots 26 which extend radially from the hub 22 to the outer edge of the cutting member 14 as shown. These slots provide a pair of edges adjacent each slot, and one edge of each pair is the cutting element as best seen in FIG. 7.

For clarity in the description, the edges of the slots will be referred to as the "leading edge" and the "trailing edge", and with respect to the direction of cutter rotation, the leading edge being that edge which would first encounter a stationary point in the work and the trailing edge being that edge which would last encounter that same point as the cutter rotates.

The trailing edge of each slot is provided with a cutting edge 28 which may be either machined in the edge or may be in the nature of a carbide insert attached to the edge of the slot in a known manner.

On the face of the cutting member 14 closest to the mandrel 12, and adjacent the trailing edge of the slot 26 at the perimeter of the cutter 14 is provided a wing-like projection 30. Projection 30 is arcuate so as to essentially follow the curvature of the cutting member 14. This projection serves to strengthen the cutter 14 and resist deformation thereof during cutting. The length of the projection 30 is not critical, provided it is of sufficient length to perform this stiffening function. Typically, the projection 30 would be on the order of one-half to three-quarters inch long, depending on the size or diameter of the cutter 14. On relatively small diameter cutters, the projection may not be needed. Alternatively, the projection 30 may be provided adjacent the leading edge or both edges of the slots 26.

Adjacent the leading edge of the slots 26, and on the face of the cutter which contacts the work, a fly cutter blade or tooth 32 may be provided. This tooth 32 assist the cutting operation and serves to provide a very clean entry cut into the workpiece. In addition, the tooth will provide a small groove at the edge of the bottom of a hole, and this groove is often important for providing an improved glue joint. Of course when a perfectly flat hole bottom is desired, the tooth 32 would not be required.

The pilot member 16 is seen in FIG. 1 to be of a disk-like configuration. The side of the pilot member which contacts the work has a diameter at the edge 34 which is substantially equal to the diameter of the pre-existing hole to be enlarged. Because of the concentricity of the pilot member 16, the cutter 14 and the mandrel 12, the edge 34 serves to align the cutter 14 on the center of the pre-existing hole, thereby assuring a reliable alignment of the center of the enlarged hole with the center of the original hole.

Figure 3:
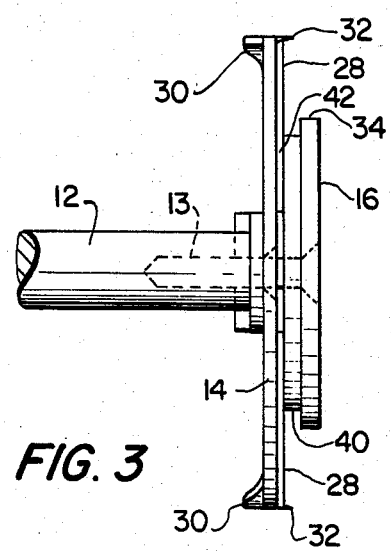
FIG. 3 is a side elevation view of the embodiment of FIG. 1.

The pilot member 16 is also provided with a central hub portion 36 of smaller diameter than the pilot edge 34 which thereby establishes a shoulder 40. In this manner, the pilot portion 34 is axially spaced from the cutter 14, improving the axial alignment of the tool in the pre-existing hole and providing a relief or clearance 42 for the cutting edges 28 and for chips or shavings of the workpiece, as seen in FIG. 3.

The pilot member 16 may be provided in a number of different standard sizes for use with a number of different cutters 14. The diameter of the hub 36 of the pilot member 16 would typically be about one-quarter to one-half inch less than the diameter of the pilot 34.

The pilot member 16 is provided with a central hole 44 which on the front face of the member 16 has a tapered or countersunk portion 46. The screw 18 also has a tapered head 48, which enables the screw 18 to be recessed into the face of the member 16 and be flush therewith.

Figure 2:
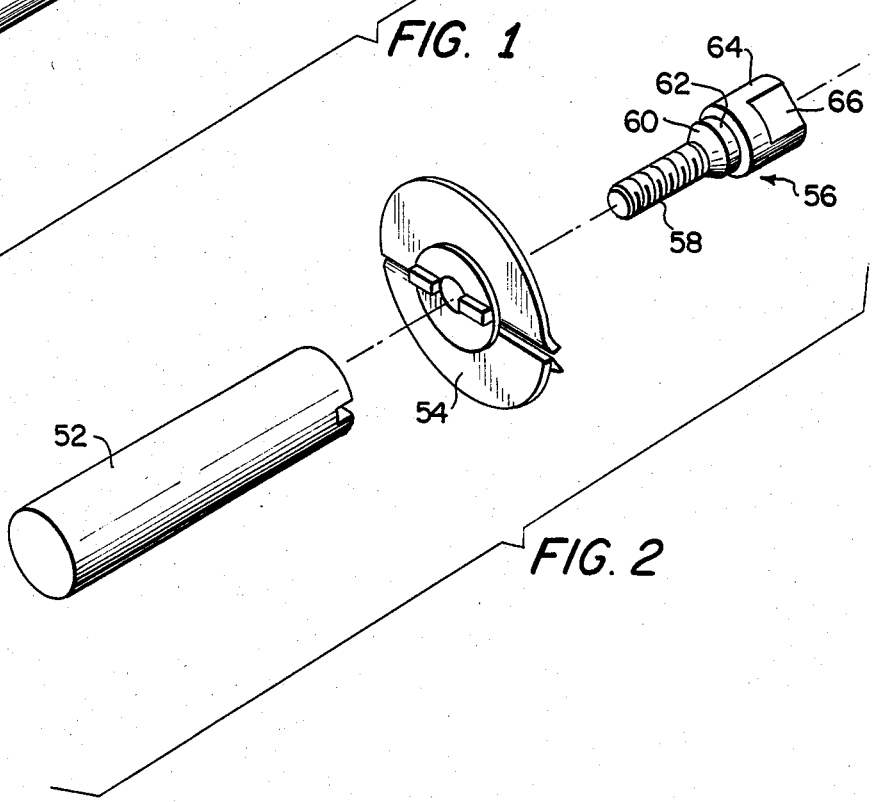
FIG. 2 is an exploded perspective view of another embodiment of the present invention.
Figure 4:
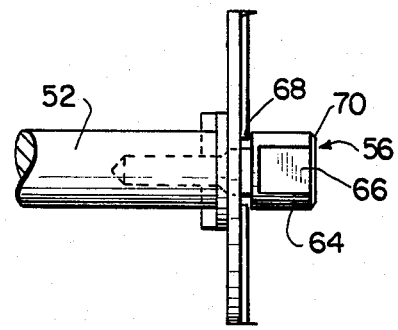
FIG. 4 is a side elevation view of the embodiment of FIG. 2.
Figure 5:
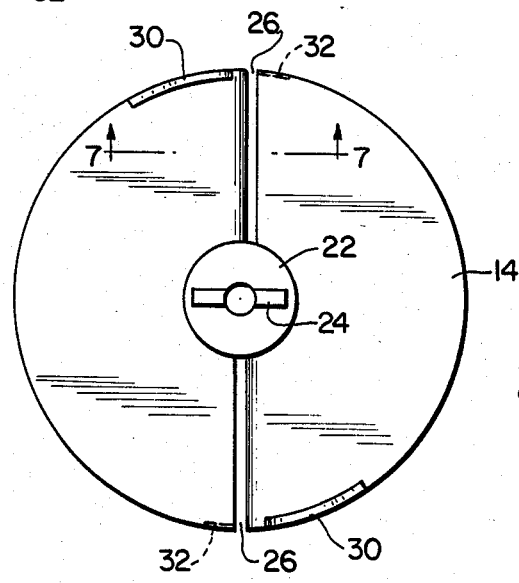
FIG. 5 is a rear elevation view of the cutting member of the tool.
Figure 6:
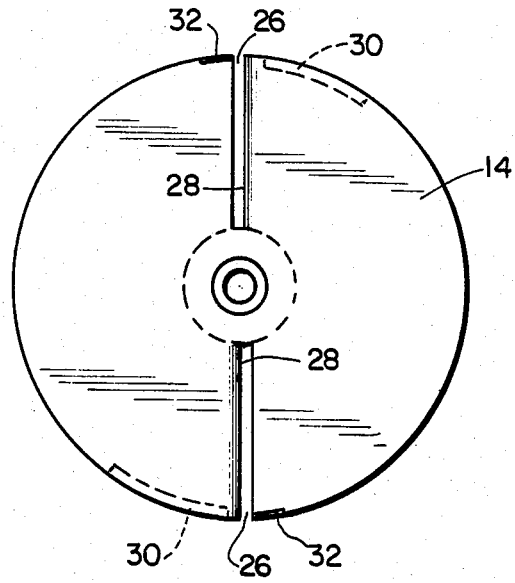
FIG. 6 is a front elevation view of the cutting member of the tool.

Turning now to the embodiment of FIGS. 2 and 4. In this embodiment, the mandrel and cutting member are substantially identical with those same parts in the other embodiment. However, the FIGS. 2 and 4 embodiment is intended for use when a smaller pre-existing hole is used and/or when the diameter of the enlarged hole is not as great. For this reason, the stiffening wing may not be required.

A mandrel 52 is identical to mandrel 12, and cutting member 54 is identical to cutter 14, but does not have the wings 30.

The pilot member 56 of this embodiment is formed integrally with the screw used for assembling the components. Thus, a threaded shank or screw 58 is provided with a tapered or countersinking head 60 which extends to a shoulder 62. A pilot portion 64 is of greater diameter than the shoulder 62 and is of an axial length sufficient to provide adequate alignment capabilities in the pre-existing hole. Preferably the pilot portion 64 is also provided with a pair of flats 66 to enable a wrench to be used to tighten the assembly when the screw 58 is passed through the cutter member 54 and threaded into the mandrel 52.

In this embodiment, the shoulder 62 provides a relief or clearance 68 corresponding to the relief 42. To facilitate entry of the tool into an existing hole, the leading edge of the pilot member 56 may be provided with a chamfer 70. If necessary, this chamfer may also be provided on the leading edge of the pilot member 16. Similarly, a chamfer may also be provided on the rear edge of the cutter members, in order to facilitate withdrawal of the tool from the newly bored hole.

It will be readily apparent that the pilot members 16 and 56 are readily interchangeable, enabling a great degree of versatility in the use of the tool by craftsmen for a variety of different size operations. In addition, multiple stepped holes may be generated in a workpiece by selective use of different cutters and different pilot members.

While this invention has been described in reference to certain embodiments, it will be apparent that it is capable of still further modification, and this application is intended to cover all variations, adaptations and modifications as come within the spirit of the invention and the scope of the claims.

What I claim is:

1. A hole sizing tool for enlarging a previously drilled hole comprising a drive mandrel for engagement in a chuck or collet, a cutting member, and pilot-screw means for attaching said cutting member to said mandrel, said cutting member comprising a disk-like element having a continuous central thickened annular hub portion and a pair of diametrically opposed radially directed slots in said disk-like element and extending from said hub portion to the periphery of said disk-like element and cutting edges formed in one edge of each of said slots and extending from said hub portion to the edge of said element on one face thereof and key means projecting from said hub portion on the opposite face of said cutting member, slot means on an end of said mandrel for engaging said key means, said pilot-screw means further comprising pilot means for engaging the wall of the previously drilled hole and means defining an undercut between said pilot means and said cutting member, and said disk-like element including a raised wing-like stiffening member projecting from said opposite face thereof adjacent on edge of each of said slots.

2. A hole sizing tool as in claim 1 and wherein said stiffening member is arcuate and extends along the periphery of said element.

3. A hole sizing tool as in claim 1 and wherein said disk-like element includes a fly-cutting blade adjacent the periphery of said element and extending from the leading edge of each of said slots.

4. A hole sizing tool as in claim 1 and wherein said pilot screw means comprises an integral threaded screw portion, a head portion and a pilot portion, said pilot portion being spaced from said head portion and being of a greater diameter than said head portion so as to form a relief between said pilot portion and said cutter.

5. A hole sizing tool as in claim 4 and wherein said head portion is tapered so as to engage a correspondingly tapered portion of said element.

6. A hole sizing tool as in claim 4 and including a pair of flats formed on diametrically opposed sides of said pilot portion.

7. A hole sizing tool as in claim 4 and wherein the front face of said pilot portion is chamfered.

8. A hole sizing tool as in claim 1 and wherein the peripheral edge of said cutting member includes a chamfer formed on said opposite face thereof.

9. A hole sizing tool as in claim 1 and wherein said pilot screw means comprises a disk-like member having a central hole therein and a screw passing through said hole into said mandrel.

10. A hole sizing tool as in claim 9 and wherein said disk-like member comprises an annular body having a leading annular pilot portion and a trailing portion engaging said cutting member, said trailing portion being of smaller diameter that said pilot portion so as to form a relief between said pilot portion and said cutting member.

11. A hole sizing tool as in claim 12 and wherein said hole is tapered and said screw includes a tapered head portion for engaging said tapered hole.

* * * * *